(12) United States Patent
Remmler

(10) Patent No.: US 7,841,252 B2
(45) Date of Patent: Nov. 30, 2010

(54) POWERSHIFT GEARBOX AND SHIFTING METHOD THEREFOR

(75) Inventor: Mathias Remmler, Mauchenheim (DE)

(73) Assignee: GM Global Technology Operations, Inc., Detroit, MI (US)

( * ) Notice: Subject to any disclaimer, the term of this patent is extended or adjusted under 35 U.S.C. 154(b) by 700 days.

(21) Appl. No.: 11/574,107

(22) PCT Filed: Jul. 30, 2005

(86) PCT No.: PCT/EP2005/008286

§ 371 (c)(1),
(2), (4) Date: Feb. 22, 2007

(87) PCT Pub. No.: WO2006/024352

PCT Pub. Date: Mar. 9, 2006

(65) Prior Publication Data

US 2008/0092681 A1    Apr. 24, 2008

(30) Foreign Application Priority Data

Aug. 27, 2004  (DE) ................. 10 2004 041 525

(51) Int. Cl.
*F16H 3/087* (2006.01)
(52) U.S. Cl. ......................................... 74/330
(58) Field of Classification Search ............. 74/330, 74/331, 339, 359, 360
See application file for complete search history.

(56) References Cited

U.S. PATENT DOCUMENTS

| 5,761,961 A | 6/1998 | Krauss et al. |
| 2004/0224811 A1* | 11/2004 | Vornehm et al. ............ 475/207 |

FOREIGN PATENT DOCUMENTS

| DE | 4206033 | 3/1993 |
| DE | 19924501 | 12/2000 |
| DE | 10338558 | 3/2004 |
| EP | 1028270 | 8/2000 |
| FR | 2838174 | 10/2003 |
| WO | 0188409 | 11/2001 |

\* cited by examiner

*Primary Examiner*—Sherry L Estremsky
*Assistant Examiner*—Edwin A. Young
(74) *Attorney, Agent, or Firm*—Ingrassia Fisher & Lorenz, P.C.

(57) ABSTRACT

A powershift gearbox includes a first and a second gearbox block in which respectively one gear from a first or second set of gears associated with each gearbox block can be passed between an input shaft and an output shaft of the gearbox block. The inventive gearbox comprises a slip-free clutch arrangement between each gearbox block and a common drive shaft of the powershift gearbox, that enables the input shaft of the gearbox block to be coupled to the drive shaft either directly or by means of a common slippable clutch.

5 Claims, 5 Drawing Sheets

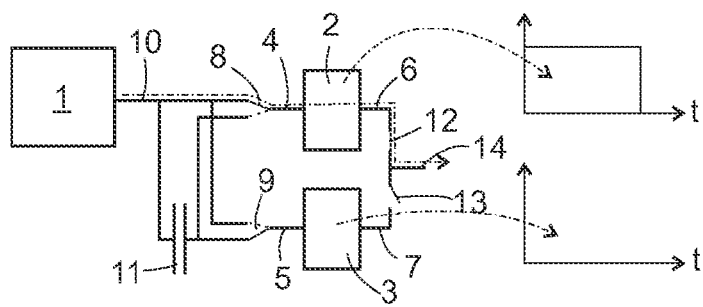
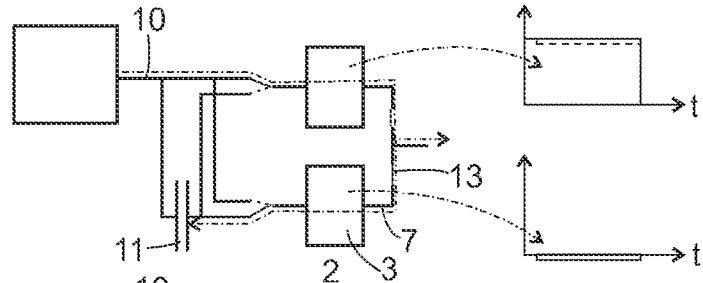
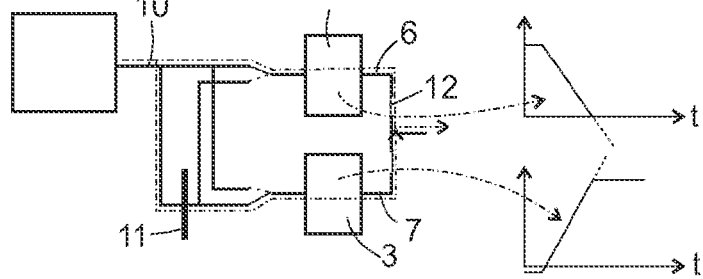
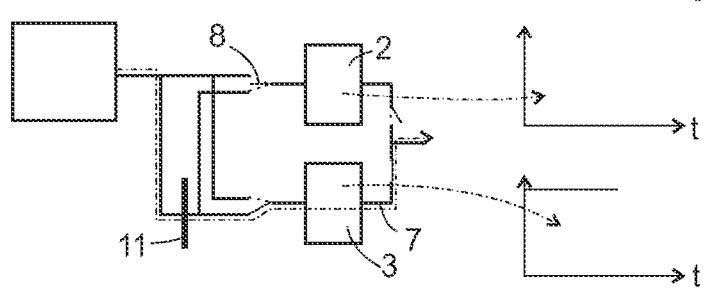
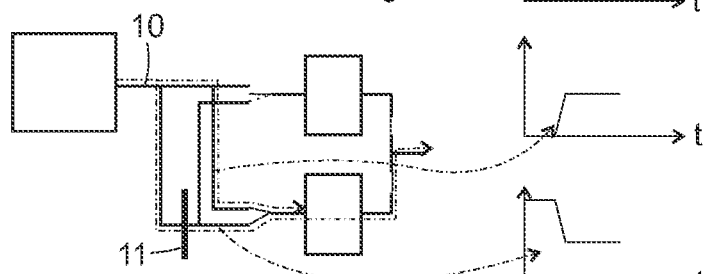
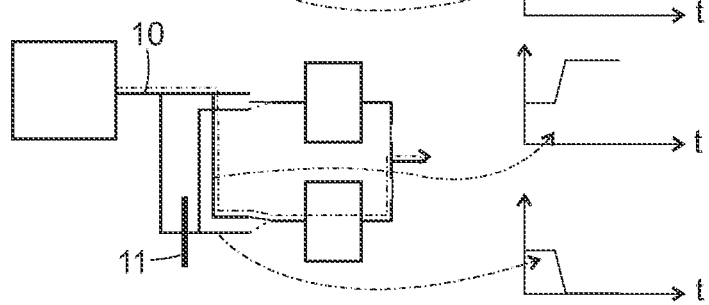

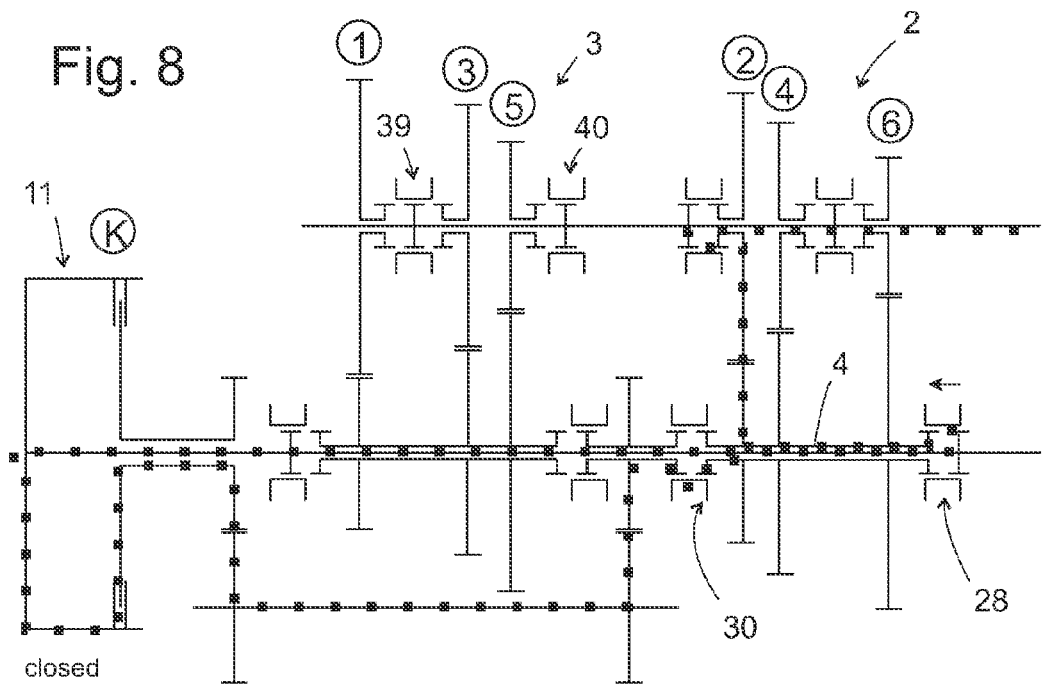
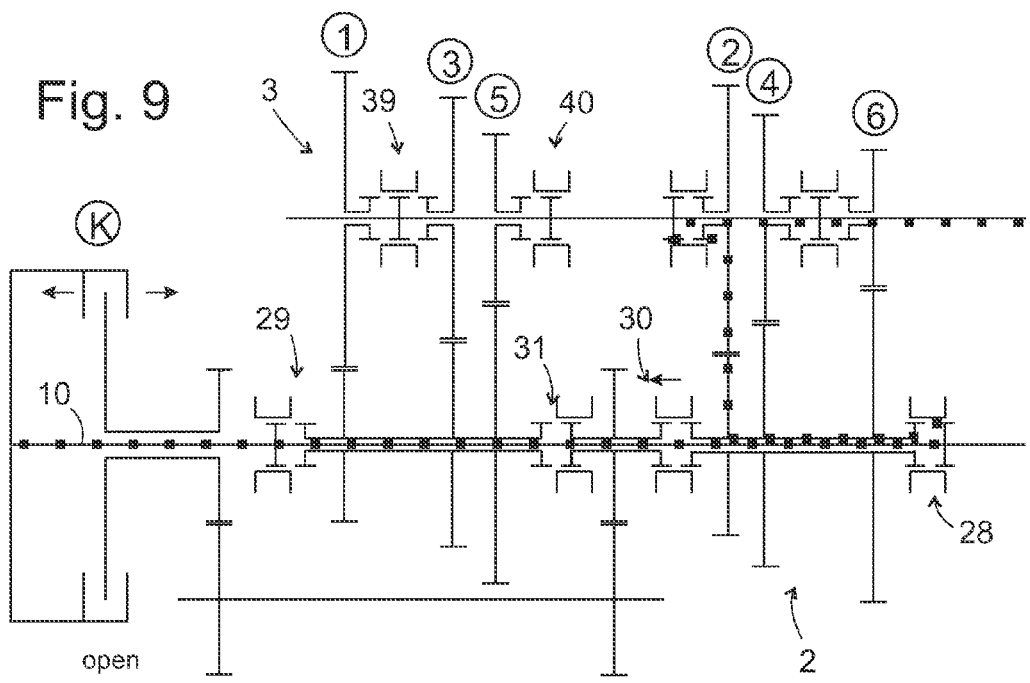

POWERSHIFT GEARBOX AND SHIFTING METHOD THEREFOR

CROSS-REFERENCE TO RELATED APPLICATIONS

This application is a U.S. National-Stage entry under 35 U.S.C. §371 based on International Application No. PCT/EP2005/008286, filed Jul. 30, 2005, which was published under PCT Article 21(2) and which claims priority to German Application No. DE 10 2004 041 525.0, filed Aug. 27, 2004.

BACKGROUND

The present invention relates to a power shift transmission in which the process of shifting between different gears is adapted to be effected without interrupting the tractive power, and also to a method of operating such a transmission.

A conventional transmission of this type is described in DE 42 06 033 C2. This known transmission can be summarized as being one that is built up of two gear units in which different transmission ratios or gears are adapted to be set-up between an input shaft and an output shaft of each gear unit. Furthermore, the transmission comprises two drive shafts which are adapted to be driven by the same engine and two clutches which are respectively arranged between one of these drive shafts and the input shaft of a gear unit.

When a shift between two gears is not about to take place, one of the two clutches is open and the other one is closed and torque is transferred from the engine via the closed clutch and the gear unit attached thereto to an output drive shaft common to both gear units.

In order to effect a gear change with the known transmission, the new gear to be utilized is firstly preselected in the non-loaded gear unit, i.e. a torque-coupling connection is established in the gear unit between the output drive shaft and that part of its clutch facing the load-free gear unit. By contrast, the part of the self-same clutch on the engine side is driven directly by the drive shaft. The two parts of the clutch therefore rotate at different speeds, the ratio therebetween being determined by the transmission ratios of the currently engaged gear and the preselected gear.

In order to actually engage the preselected gear, the clutch for the as yet load-free gear unit is gradually closed so that a portion of the engine torque is transferred therethrough, whilst the clutch of the currently loaded gear unit is gradually opened at the same time so that the moment transferred by this clutch becomes smaller. Since the two clutches are never open at the same time, the gear change is effected without an interruption of the tractive power, but nevertheless slippage between the parts of the clutches inevitably occurs for as long as the shifting process persists.

Consequently, only clutches that are capable of slipping can be considered for such a transmission. The requisite size of the clutches is determined by the need for the entire engine moment to be transferred to the transmission when the clutch is closed; the two clutches thus require a considerable amount of space. Moreover, they contribute to a not insignificant degree to the costs of the transmission.

SUMMARY

The object of the present invention is to produce a compact and inexpensively realizable power shift transmission for changing gear without interruption.

In accordance with the invention, this object is achieved in that in a power shift transmission comprising a first and a second gear unit in which in each case a gear from a first and a second set of gears associated with each gear unit is adapted to be engaged between an input shaft and an output shaft of the gear unit, wherein there is provided between the gear unit and a common drive shaft of the power shift transmission a slip-free clutch arrangement which enables the input shaft of the gear unit to be coupled selectively either directly or via a common slippable clutch to the drive shaft. The power shift transmission in accordance with the invention thus manages to operate with just one slippable clutch; the slip-free clutch arrangements that are provided instead are comparatively compact and more economical to realize in comparison with a slippable clutch since they generally use interlocking rather than frictional engagement for the transmission of the torque.

Preferably, each of the clutch arrangements comprises two slip-free clutches arranged at opposite ends of the input shaft of the gear unit associated with the clutch arrangement, of which the first is adapted to be directly coupled to the drive shaft and the second is adapted to be coupled to the drive shaft via the slippable clutch.

Moreover, a compact construction is obtained in that the input shafts of the gear unit are in the form of hollow shafts that are coaxial with the drive shaft.

Preferably, an intermediate hollow shaft that is adapted to be driven in rotary manner by the slippable clutch is arranged coaxially relative to the drive shaft in a gap between the two input shafts, and the second clutches serve in each case for connecting the intermediate hollow shaft to the input shafts of the gear units.

For the purposes of obtaining a space-saving construction, it is also expedient for the slippable clutch to be arranged coaxially on the drive shaft.

In order to connect the output drive side of the slippable clutch that is coaxial with the drive shaft to the second clutches mentioned above, there is preferably provided a bypass shaft which is offset in parallel with the drive shaft.

A further slip-free clutch is preferably provided between each output shaft of a gear unit and a common output drive shaft of the power shift transmission. Of these clutches and insofar as a shift between two gears is not about to take place, one of the them is preferably always open so that the respective load-free gear unit does not have to be driven in rotary manner and thus too, no losses of energy are produced.

The slip-free clutches are preferably in the form of claw clutches.

The subject matter of the invention is also a method for operating a power shift transmission of the type described above. The gear-change process proceeds by firstly engaging a desired gear in a load-free gear unit, referred to hereinafter as the taking-over gear unit, so that the input shaft of the taking-over gear unit is driven in rotary manner by its output shaft and the momentarily still load-bearing gear unit, referred to hereinafter as the delivering gear unit. The taking-over gear unit is gradually coupled to the drive shaft by the slippable clutch. During the gradual coupling process, the load component flowing via the taking-over gear unit gradually increases until a time point is reached at which the delivering gear unit becomes load-free. At this point in time, the slip-free clutch which connects the delivering block to the drive shaft can be disengaged, and—at least provisionally— the new gear is engaged.

Since a renewed gear change is not possible for as long as the taking-over gear unit is being driven by the slippable clutch, the input shaft of the taking-over gear unit is expediently coupled directly to the drive shaft and the slippable clutch is released again after the closure of the slippable clutch.

In order to ensure that the slip-free clutch of the delivering gear unit disengages exactly at the time point when there is no load thereon, it suffices to exert a force on this clutch in the direction of a disengaging movement; as soon as the clutch becomes load-free, the parts thereof are moveable against each other and can yield to the force.

BRIEF DESCRIPTION OF THE DRAWINGS

The present invention will hereinafter be described in conjunction with the following drawing figure, wherein like numerals denote like elements, and a. FIG. 1 shows a heavily schematized illustration of a transmission in accordance with the invention in the course of several steps of a gear-changing process as well as the load fed through the gear unit during these steps; and b. FIGS. 2 to 9 show the construction of a preferred exemplary embodiment of a transmission in accordance with the invention as well as the course of a gear-changing process in this transmission.

DETAILED DESCRIPTION

Figure 2:
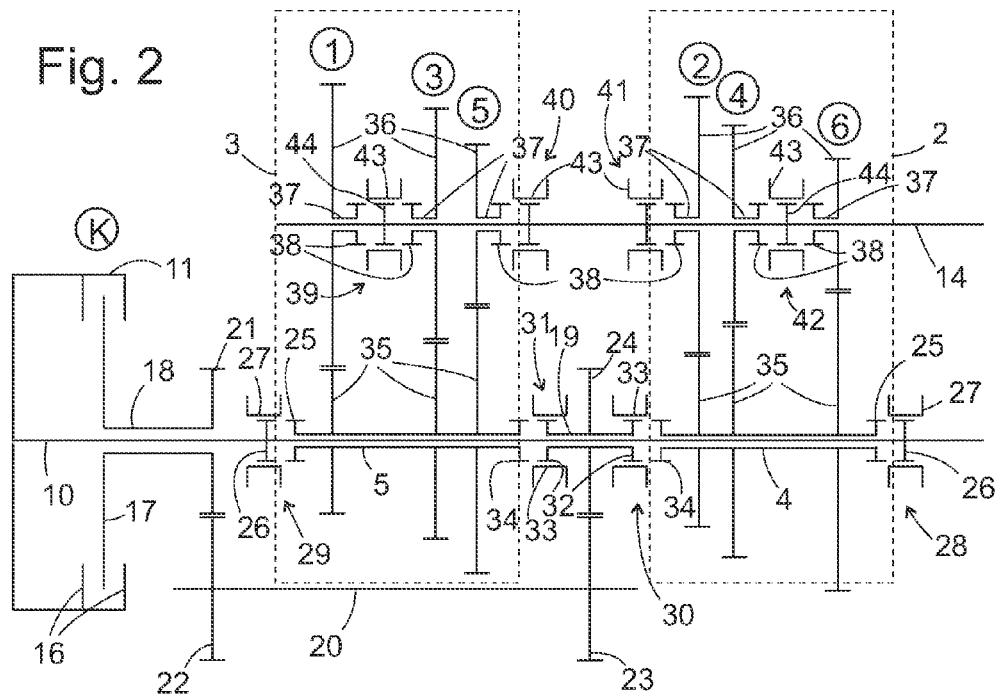

The following detailed description of the invention is merely exemplary in nature and is not intended to limit the invention or the application and uses of the invention. Furthermore, there is no intention to be bound by any theory presented in the preceding background of the invention or the following detailed description of the invention.

FIG. 1 is sub-divided into six parts, designated A to F, which respectively show the state of a power shift transmission driven by an engine 1 in a stationary operating state and in different stages of a gear shifting process.

The power shift transmission comprises two gear units 2, 3 each having a respective input shaft 4 and 5 and an output shaft 6 and 7. A given set of transmission ratios or gears is adapted to be set-up between the input shaft 4, 5 and the output shaft 6, 7 in each gear unit, whereby the gears of the first gear unit 3 correspond to the odd-numbered gears of the entire power shift transmission, thus e.g. the gears 1, 3, 5 of a six-gear transmission, and those of the second gear unit 2 correspond to the even-numbered gears, i.e. the gears 2, 4, 6.

On each input shaft 4, 5 there is arranged a respective claw clutch 8 and 9 which serves the purpose of directly or indirectly coupling the associated input shaft 4 or 5 via a friction clutch 11 to one of the drive shafts 10 that are driven by the engine 1. The claw clutches 8, 9 can also exhibit an open position in which they do not connect the respective input shaft 4 or 5 to the engine 1.

The respective output shafts 6, 7 of the gear units 2, 3 are connectable via a further claw clutch 12, 13 to a common output drive shaft 14 of the power shift transmission.

In part A thereof, FIG. 1 shows the power shift transmission with an even-numbered gear, e.g. the second gear, engaged. The load flow from the engine 1 to the output drive shaft 14 is illustrated by a dash-dotted line extending along the loaded parts of the transmission. It leads from the engine 1 via the drive shaft 10 and the closed claw clutch 8 to the gear unit 2 in which the second gear is engaged, and from there via the closed claw clutch 12 to the output drive shaft 14. The claw clutch 13 between the output drive shaft 14 and the gear unit 3 is open, in exactly the same manner as the friction clutch 11 to which the input shaft 5 of the gear unit 3 is connected by the clutch 9. The gear unit 3 is not being driven.

The two diagrams located laterally of the representation of the transmission in part A of FIG. 1 illustrate in each case the load on the two gear units; the gear unit 2 is under a constant positive load, i.e. a load flowing from the engine 1 to the output drive shaft 14, whereas that on the gear unit 3 disappears.

In order to prepare for a gear change, the desired gear is firstly preselected in the non-loaded gear unit 3. In principle, any gear in this gear unit 3 could be selected, but one generally selects one that neighbors the current gear, i.e. the first or third gear. Next, as is shown in part B, the clutch 13 is closed so that the gear unit 3 is set into rotation by its output drive shaft 7. Namely, a part of the torque available at the output of the gear unit 2 is utilized for driving the gear unit 3, and the torque present on the output drive shaft 14 is slightly smaller than the total torque at the output of the gear unit 2, as is indicated by the dashed waveform in the upper diagram of part B. There is a weak load flow from the output to the drive side in the gear unit 3, as is indicated in the lower diagram of part B. In this diagram, the load flow, directed there from the output to the drive side of the gear unit 3, is illustrated with a negative prefix sign. Both sides of the friction clutch 11 are now being driven in rotary manner, the side facing the engine at the rotational speed of the drive shaft 10, and the side facing the gear units at a rotational speed which is determined by the transmission ratio of the gears engaged in the gear units 2, 3.

Next, the friction clutch 11 is gradually closed as is shown in part C. In consequence, the load flow is distributed to the two gear units 2, 3. If one considers the case of shifting from second into third gear as a concrete example, then one will appreciate that the rotational speed of the part of the clutch 11 on the engine side must be higher than that of the part connected to the gear unit 3. The clutch 11 thus attempts to accelerate the gear unit 3 to a certain extent and to brake the gear unit 2, whereby however, matching of the rotational speeds of the two parts of the clutch 11 is not possible as long as a gear is engaged in both gear units. The difference in rotational speed does however lead to the gear unit 3 taking ever more load from the gear unit 2 with increasing pressure of the clutch 11 until a time point is reached at which the load on the gear unit 2 disappears. At this point in time, the now load-free claw clutch 8 opens, and the stage in part D of FIG. 1 is reached. The load flow now runs exclusively via the friction clutch 11 and the gear unit 3.

No further gear change can be initiated for as long as the clutch 11 is closed. However, since the drive shaft 10 and the side of the clutch 11 facing the transmission have equal rotational speeds, it is possible to establish a direct load connection between the drive shaft 10 and the input shaft 5 via the clutch arrangement 9, as is shown in part E, so that the load flow from the engine 1 to the gear unit 3 is distributed over the direct path and the path via the friction clutch 11 as is illustrated in the diagrams.

Subsequently, the connection of the input shaft 5 to the clutch 11 is removed as is shown in part F. The friction clutch 11 is now load-free again, and the gear unit 3 is driven directly by the engine 1. After the friction clutch 11 has opened again, a further gear change can take place as is illustrated in parts A to F, whereby the roles of the gear units 2, 3 are exchanged in the course of this renewed gear change.

FIG. 2 shows a more detailed scheme for the construction of a power shift transmission in accordance with the invention. The engine 1 is left out of this Figure, as well as out of those following. The friction clutch 11 is mounted coaxially on the drive shaft 10 of the transmission and it comprises a first disk which is rigidly mounted on the drive shaft 10 and incorporates axially displaceable clamping members 16 for clamping a second disk 17 which is fixed to a hollow shaft 18 that is coaxial with the drive shaft 10.

Two further hollow shafts coaxial with the drive shaft 10 form the input shafts 4 and 5 of the two gear units 2, 3. An intermediate hollow shaft 19 which is arranged between the hollow shafts 4, 5 on the drive shaft 10 is connected to the hollow shafts 18 via a bypass shaft 20 that is parallel to the drive shaft 10 and pairs of interengaging gear wheels 21, 22 and 23, 24 on the shafts 18, 20, 19.

At the mutually remote ends thereof, the two input shafts 4, 5 carry an axial tooth structure 25 which, together with a pinion 26 rigidly mounted on the drive shaft 10 and an internally and axially toothed sleeve or operating collar 27 that is axially displaceable on the pinion 26, form a claw clutch which is designated as a whole by 28 on the drive shaft 4 of the gear unit 2 and by 29 on the drive shaft 5 of the gear unit 3. Furthermore, the claw clutches 28, 29 comprise in known manner a not shown synchronizing unit which serves the purpose of equalizing the rotational speed necessary for the engagement of the operating collar 27 with the axially toothed structure 25 by means of a non-positive coupling, in particular, by friction. This synchronizing unit can be understood as being a kind of positive pre-coupling; it differs from the likewise positive friction clutch 11 by virtue of its dimensions: whereas the friction clutch 11 is designed such as to enable it to transfer the entire torque of the engine, it suffices for the synchronizing unit that it can transfer a maximal amount of torque which is sufficient for overcoming inertia and friction in the associated gear unit 2 or 3; transmission of drive moment via a synchronizing unit to the running gear is not envisaged. The synchronizing unit can be formed, in particular, by synchronizing rings such as are to be found in conventional manual transmissions. They must be non-loaded for releasing the claw clutch 28 or 29.

A similar type of claw clutch is designated by 30 and 31 respectively at the opposite ends of the input shafts 4, 5. These clutches 30, 31 each comprise a pinion 32 on the intermediate hollow shaft 19, a sleeve or operating collar 33 that is axially displaceable on the pinion 32 and an axially toothed structure 34 on the drive shafts 4 and 5.

Furthermore, the drive shafts 4, 5 each carry in known manner three toothed gear wheels 35 of different size which respectively mesh with a complementary toothed gear wheel 36 which is connected by a hollow output drive shaft section 37 to a pinion 38 of a further claw clutch 39, 40, 41 or 42 in each case. In the case of the clutches 39, 42, a sleeve 43 is displaceable between three positions, one in which it is seated only on a pinion 44 that is rigidly connected to the output drive shaft 14, and two, in which it connects the pinion 44 to a neighboring axially toothed structure 38 on the right or on the left thereof. The clutches 41, 42 correspond in regard to the functioning thereof to the clutch 12 of FIG. 1 and the clutches 39, 40 in the clutch 13.

A gear wheel on the intermediate shaft 20 which is not illustrated in the Fig. can be brought directly into engagement with one of the toothed gear wheels 36 of the gear unit 3 by bypassing the hollow shaft 5 in order to realize a reverse gear.

Figure 3:
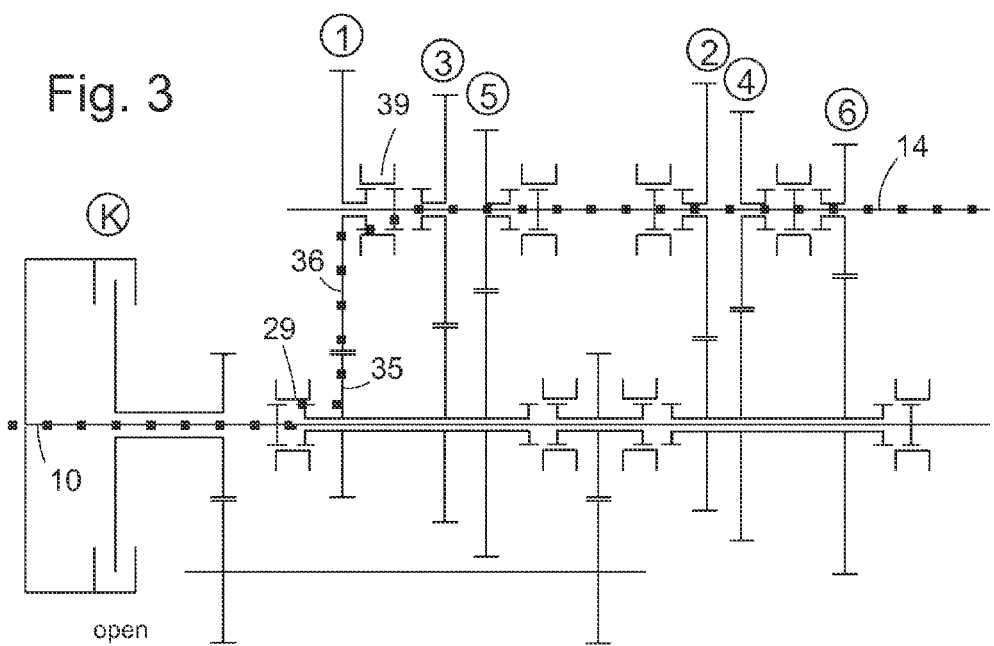

FIG. 3 illustrates the force flow through the transmission of FIG. 2 in the form of a thick dotted line. It runs from the drive shaft 10 via the closed clutch 29, the toothed gear wheels 35, 36 of the first gear in the gear unit 3 and the claw clutch 39 to the output drive shaft 14. The claw clutches 41, 42, 30 are open so that the gear unit 2 is at rest.

Figure 4:
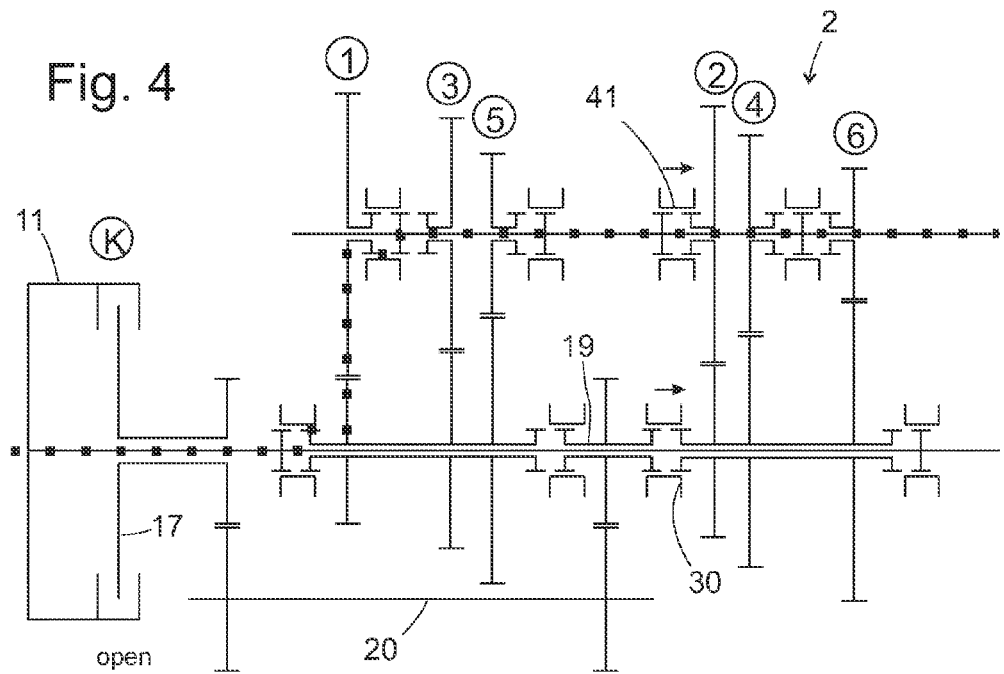

In FIG. 4, the second gear is preselected as the gear that is to be newly engaged in the gear stage 2 by closing the clutch 41. At the same time, the clutch 30 is closed so that the disk 17 of the friction clutch 11 is set to rotate via the gear unit 2, the intermediate hollow shaft 19 and the bypass shaft 20.

Figure 5:
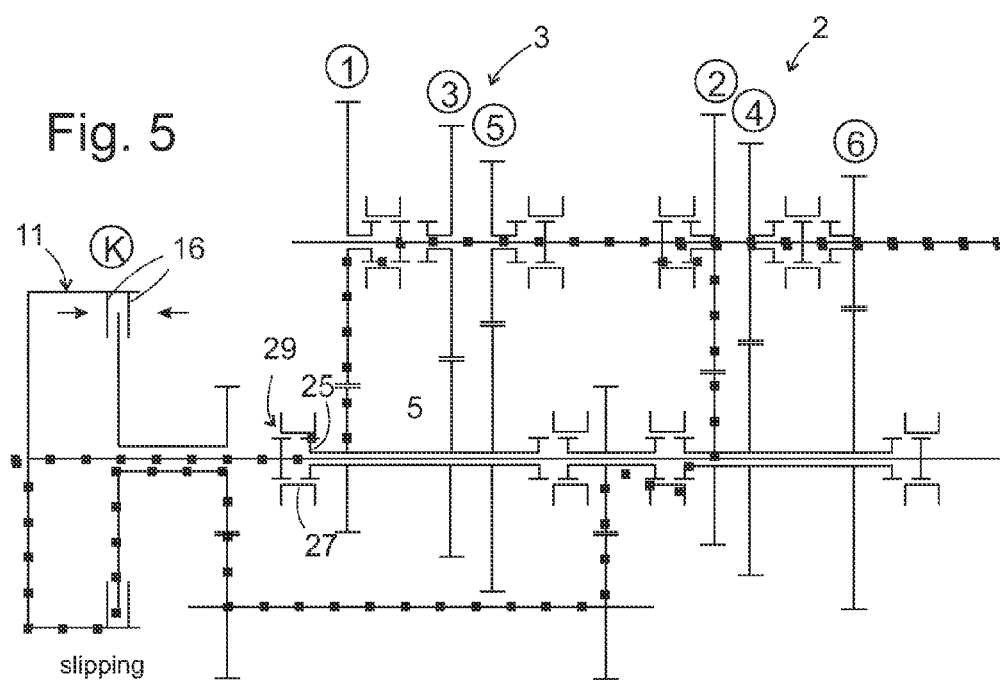
Figure 6:
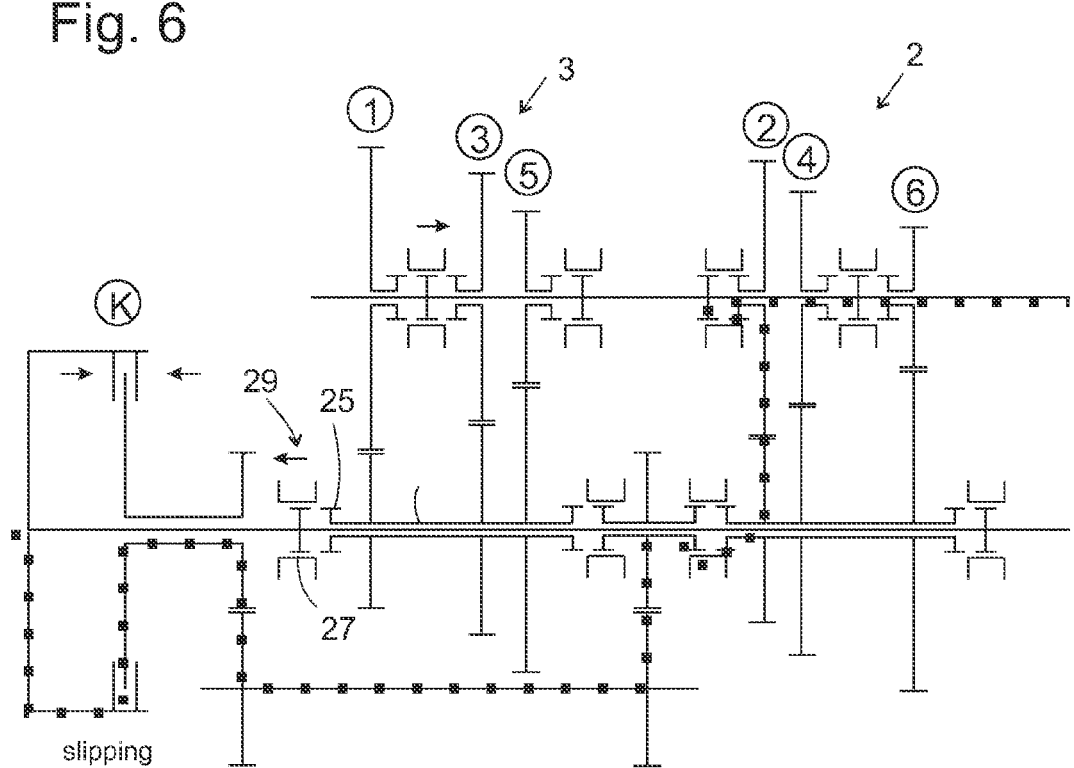
Figure 7:
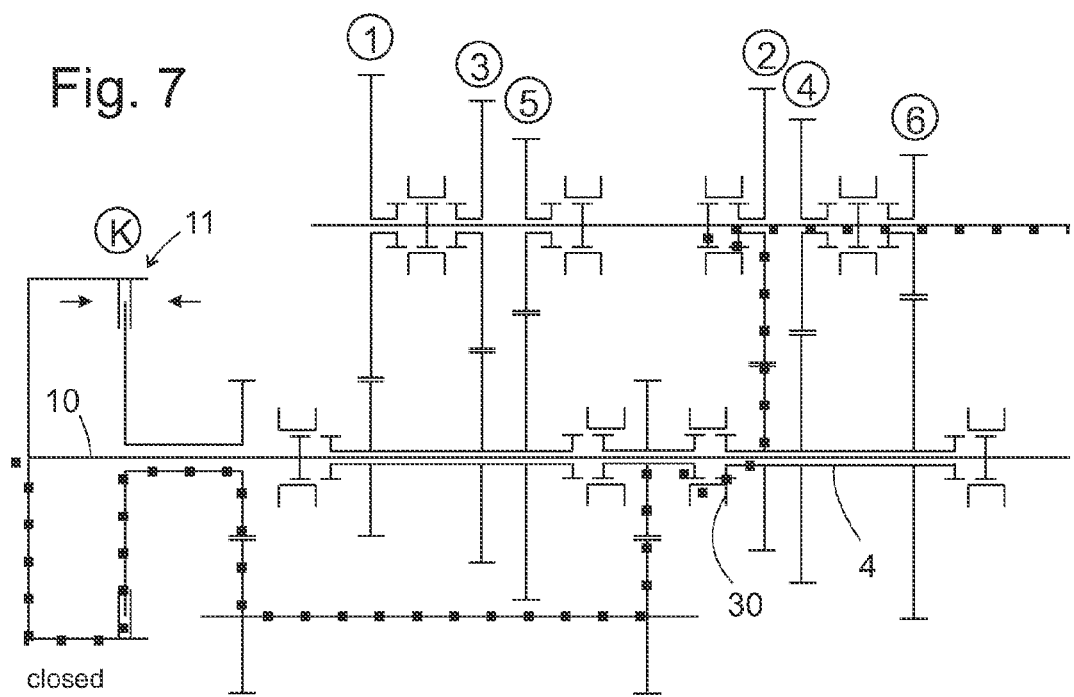

In FIG. 5, the clamping members 16 of the friction clutch 11 are gradually closed so that the load is distributed over the two gear units 2, 3. Consequently, as soon as the clutch 29 is load-free, the sleeve 27 thereof yields to a positioning force that was previously being exerted thereon and slides downwardly from the pinion 25 on the input shaft 5, as shown in FIG. 6. In consequence, the gear unit 3 becomes load-free, and the load flow is effected completely over the gear unit 2. The friction clutch 11 can now be closed completely as shown in FIG. 7 in order to transfer the motive power of the engine without slippage.

Since the input shaft 4 of the gear unit 2 is now being driven via the clutch 30 at exactly the same speed as the drive shaft 10, the clutch 28 can be closed as shown in FIG. 8. The load is now distributed over the two clutches 28, 30. In the next step, the friction clutch 11 is opened so that the clutch 30 is load-free and can be opened again.

The force flow from the drive shaft 10 via the claw clutch 28 and the second gear unit 2 shown in FIG. 9 then ensues. The clutches 29, 30, 31, 39, 40 are open so that the gear unit 3 is at a standstill. The next gear for a subsequent change of gear can now be preselected in this gear unit 3.

The operational sequence described above concerned a process of shifting up. Here, the rotational speed of the engine is lower after the shifting process than it was before, and the process of matching the rotational speed for the purposes of relieving the load on the claw clutch 29 was brought about by frictional losses, in particular, in the friction clutch 11 in the slipping state thereof, even when the engine is idling. The sequence of steps when shifting down is essentially the same as for the process of shifting up, with the only difference that the engine must be accelerated for the purposes of matching the rotational speed.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A power shift transmission comprising a first and a second gear unit in which in each case a gear from a first and a second set of gears associated with each gear unit is adapted to be engaged between an input shaft and an output shaft of the gear unit, wherein there is provided between each gear unit and a common drive shaft of the power shift transmission a slip-free clutch arrangement which enables the input shaft of the gear unit to be coupled selectively either directly or via a common slippable clutch to the drive shaft, wherein the input shafts of the gear unit are hollow shafts that are coaxial with the drive shaft.

2. A power shift transmission in accordance with claim 1, wherein an intermediate hollow shaft that is adapted to be driven in rotary manner by the slippable clutch is arranged coaxially relative to the common drive shaft between the two input shafts, and in that the second clutches respectively connect the intermediate hollow shaft to the input shafts of the gear units.

3. A power shift transmission in accordance with claim 1, wherein the slippable clutch is arranged coaxially on the common drive shaft.

4. A power shift transmission comprising:
a first and a second gear unit in which in each case a gear from a first and a second set of gears associated with each gear unit is adapted to be engaged between an input shaft and an output shaft of the gear unit, wherein there is provided between each gear unit and a common drive shaft of the power shift transmission a slip-free clutch arrangement which enables the input shaft of the gear unit to be coupled selectively either directly or via a common slippable clutch to the drive shaft;

wherein each clutch arrangement comprises two clutches arranged at opposite ends of the input shaft of the gear unit associated with the clutch arrangement, of which the first is adapted to be coupled directly to the drive shaft and the second is adapted to be coupled to the drive shaft via the slippable clutch; and wherein an output drive side of the slippable clutch is connected to the second clutches via a bypass shaft that is offset in parallel with the drive shaft.

5. A power shift transmission in accordance with claim 4, wherein the slip-free clutch arrangements are claw clutches.

* * * * *